United States Patent [19]
Russold et al.

[11] 3,871,634
[45] Mar. 18, 1975

[54] SPRING ASSEMBLY

[75] Inventors: Maximilian Russold; Heribert Sidan; Gerhard Rogen, all of Judenburg, Austria

[73] Assignee: Steirische Guszstahlwerke Aktiengesellschaft, Vienna, Austria

[22] Filed: Sept. 19, 1973

[21] Appl. No.: 398,821

[30] Foreign Application Priority Data
Mar. 1, 1973 Switzerland .................... 3160/73

[52] U.S. Cl. .................. 267/9 B, 267/168
[51] Int. Cl. ................................ F16g 7/08
[58] Field of Search ......... 267/9 R, 9 B, 168, 180, 267/162

[56] References Cited
UNITED STATES PATENTS

| | | | |
|---|---|---|---|
| 879,545 | 2/1908 | Hien | 267/9 B |
| 1,170,146 | 1/1916 | Gallagher, Jr. | 267/168 |
| 3,073,585 | 1/1963 | Hanle | 267/9 B |
| 3,171,641 | 3/1965 | Johnson | 267/9 B |

Primary Examiner—James B. Marbert
Attorney, Agent, or Firm—Holman & Stern

[57] ABSTRACT

The spring assembly has an axis and is adapted to take up and exert a force in the direction of said axis. The spring assembly comprises resilient rings which are axially stacked in alternation with rigid rings. The rigid rings are formed with peripheral sliding surfaces which have generatrices that are inclined to said axis. The resilient rings bear on said sliding surfaces. At least one of the resilient rings consists of a coiled spring which has at least two convolutions.

18 Claims, 21 Drawing Figures

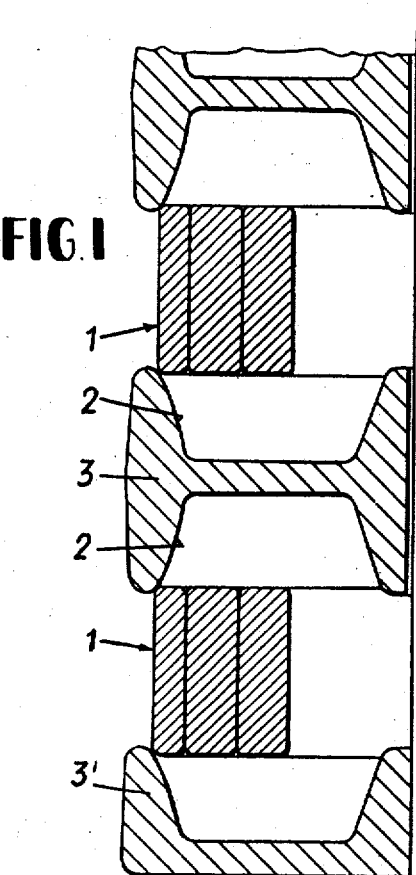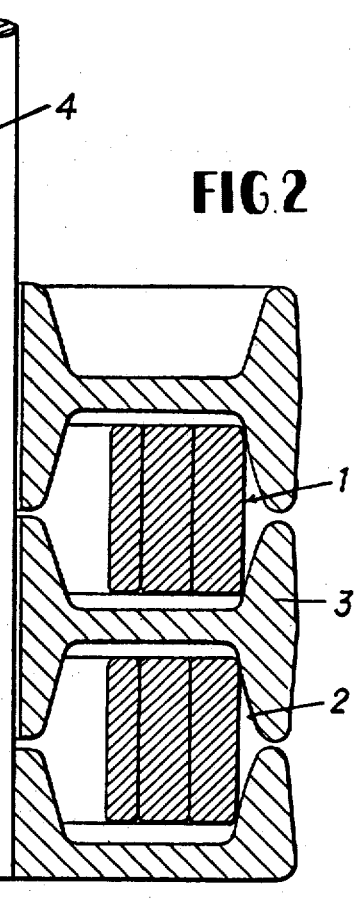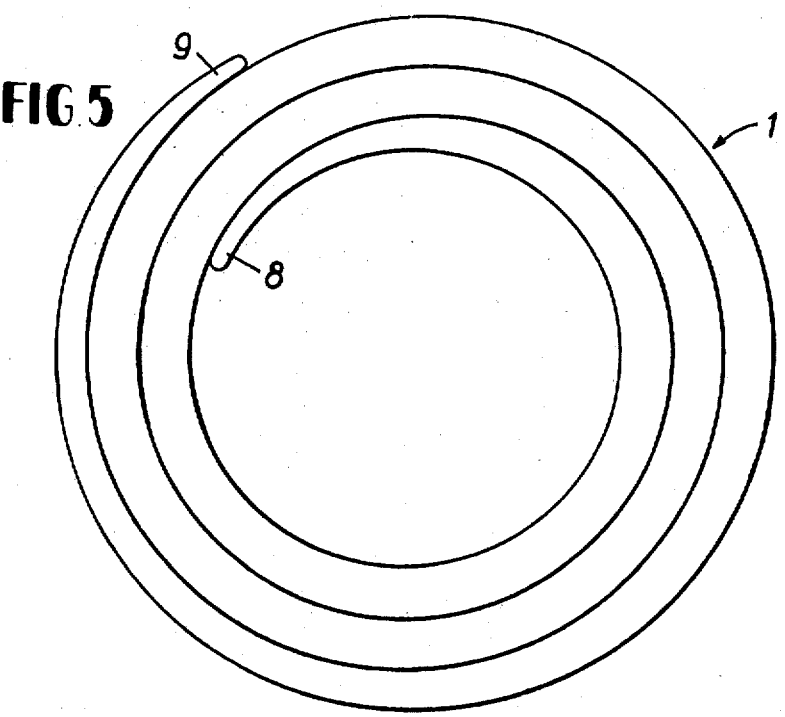

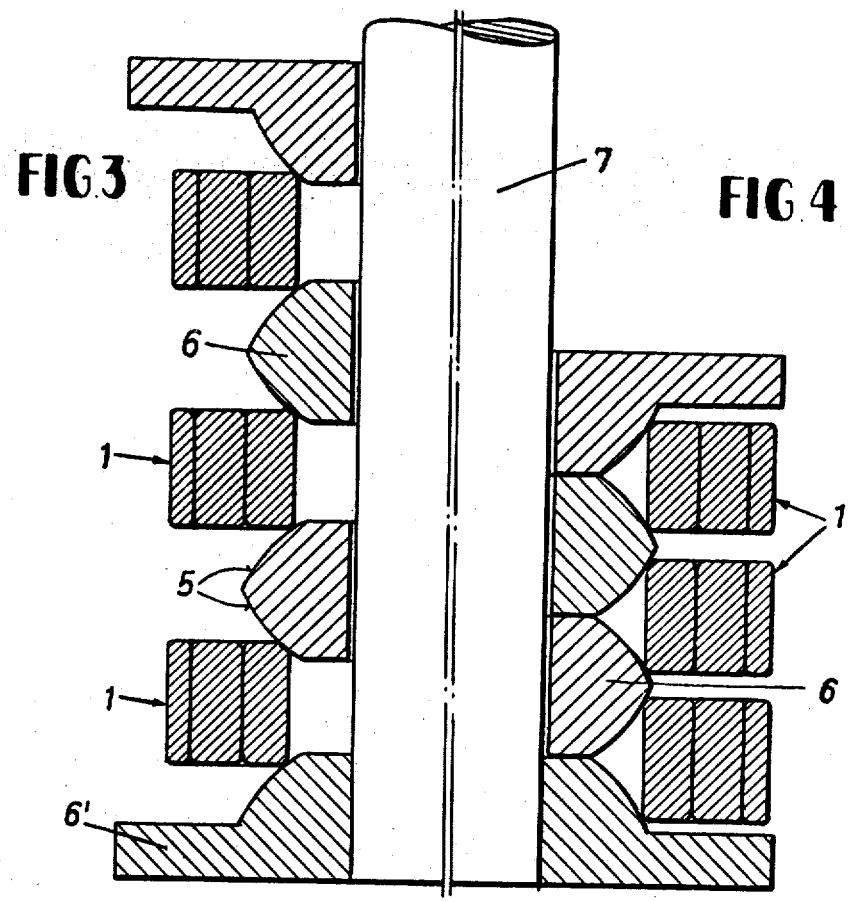
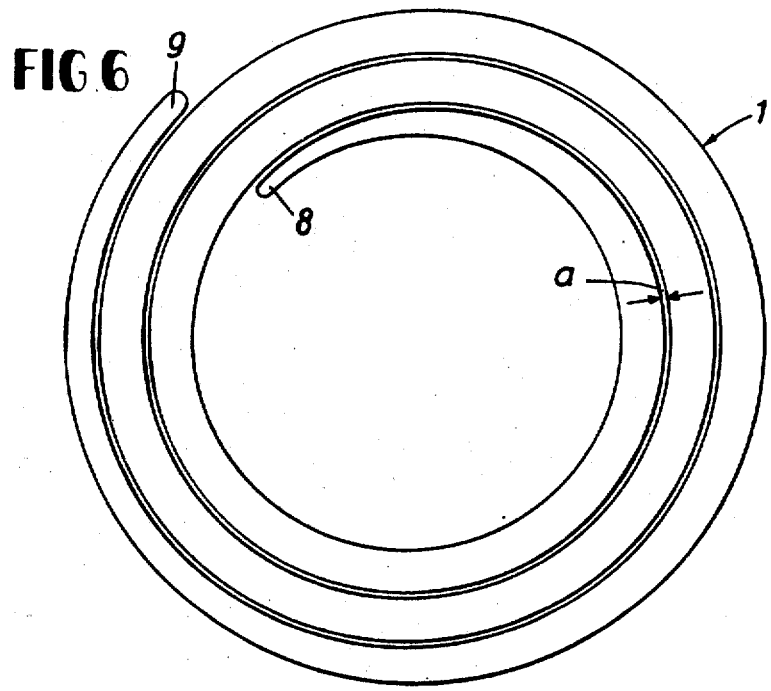

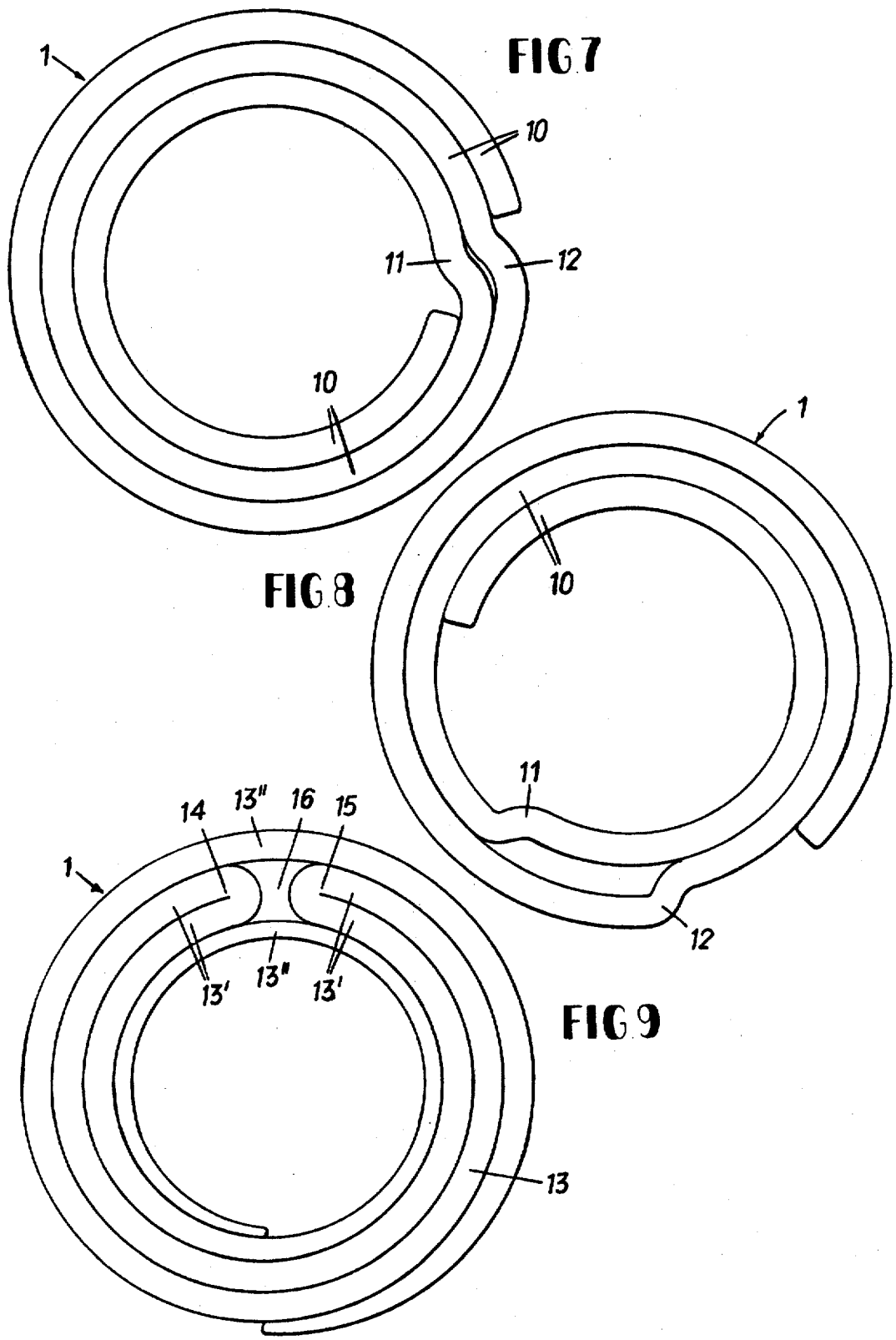

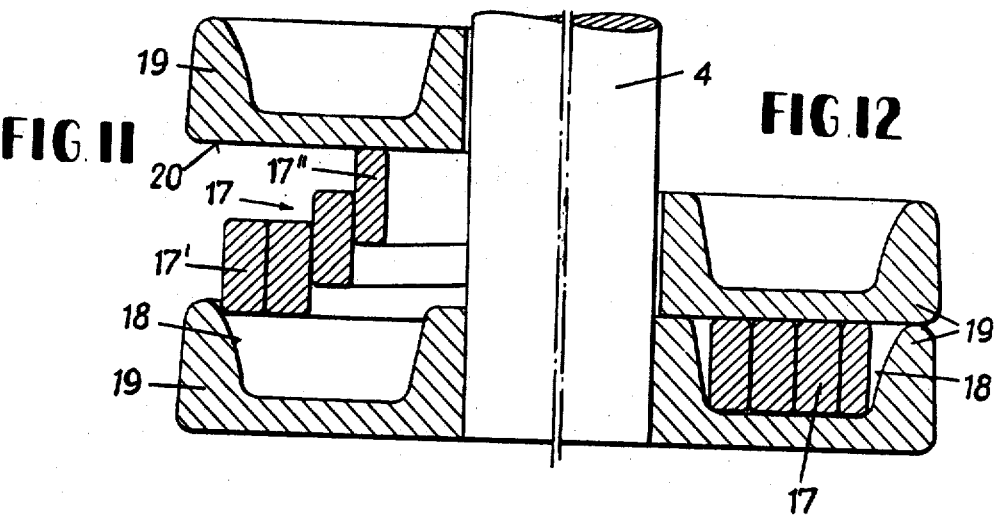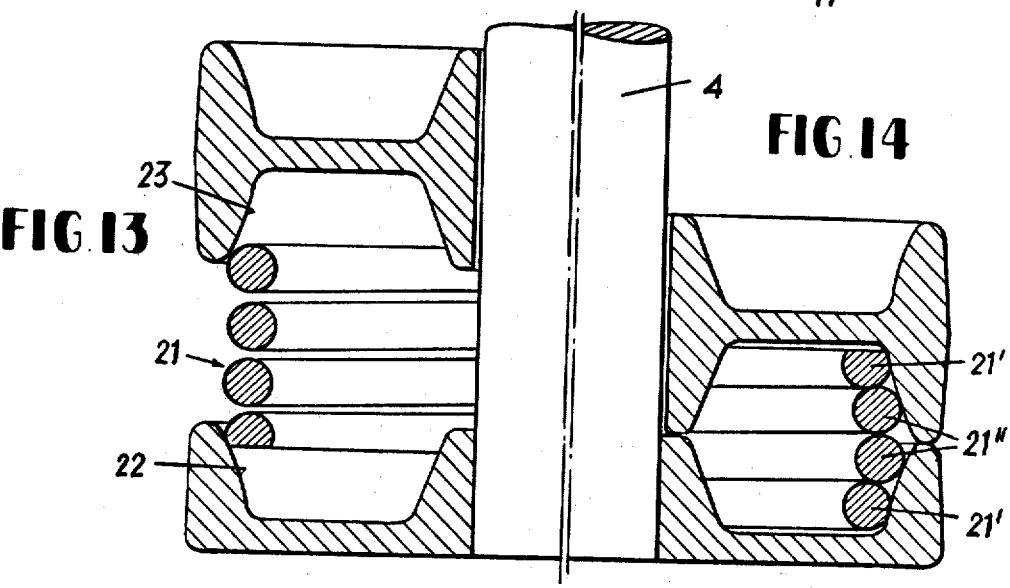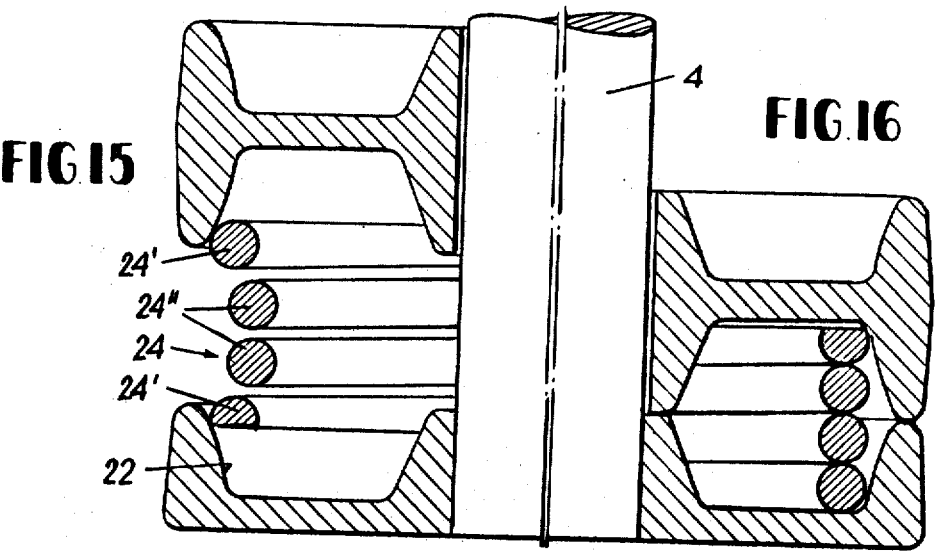

3,871,634

SPRING ASSEMBLY

BACKGROUND OF THE INVENTION

This invention relates to a spring assembly which comprises a plurality of rings which are stacked in the direction of force action in such a manner that resilient rings and rigid rings alternate and the resilient rings bear on sliding surfaces of the rigid rings, which have generatrices that are inclined to the axis of the spring. Such spring assemblies possess a high energy storage capacity. In known spring assemblies of this kind, the resilient rings are radially slit and are subjected to bending stresses as they cooperate with the sliding surfaces of the rigid rings. The forces which can be taken up by the spring assembly are limited by the bending strength of the rings.

In such spring assemblies it is known to provide the rigid rings with sliding surfaces which have curved or angled generatrices, which are inclined to the axis of the spring assembly. This design enables the provision of spring assemblies having any desired spring characteristics and ensures that the resilient rings are in line contact with the sliding surfaces of the rigid rings.

SUMMARY OF THE INVENTION

It is an object of the invention to improve such spring assembly. The invention resides substantially in that the resilient rings consist of coiled springs which have at least two and preferably at least three convolutions. In such a design, the resilience of the resilient rings themselves is improved so that the resilience of the entire spring assembly is improved too. The invention is suitably embodied in arrangements in which the generatrices of the sliding surfaces of the rigid rings are curved or angled so that any desired spring characteristic can be obtained.

According to the invention, the resilient rings may consist of plane spiral springs made of stock which is approximately rectangular in cross-section, and the arrangement may be such that the convolutions of the resilient rings contact each other even when the spring assembly is relaxed or such that when the spring assembly is under a slight load there adjacent convolutions of the resilient rings are spaced apart and these convolutions contact each other only as the load is increased. If the convolutions of the resilient rings always contact each other, the friction between the convolutions will result in a higher energy storage capacity of the spring assembly. If the convolutions of the resilient rings contact each other only as the load is increased, the spring assembly will be relatively soft in the first part of its excursion and will be harder in the second part of the excursion so that the energy storage capacity is then increased. Each resilient ring may consist in known manner of rod stock or strip and may taper in cross-section at each end over at least one convolution. Alternatively, the rod or strip stock forming the resilient ring may be uniform in cross-section throughout its length and may be formed at the end of each convolution with an offset which corresponds to the thickness of the strip. Due to this offset portion, the resilient ring has in spite of the uniform cross-section of the strip a circular outside periphery, as is required for the cooperation of the resilient rings with the sliding surfaces. Compared to the rings having tapered ends this design has the advantage of being less liable to fracture and also results in a different spring characteristic. When the convolutions of the strip do not inherently contact each other and the resilient rings have tapered ends, the spring assembly will be softer in the first part of its excursion than a spring assembly consisting of strip which is uniform in cross-section.

According to the invention, the hand in which the rod or strip forming the plane spiral spring is wound may be changed twice by a provision of reverse bends in the strip. In this case the spring characteristic of the resilient ring itself is changed. This resilient ring has then in part the shape of a radially slit ring and the strip ends overlap the slit portion so that the resiliency is damped.

According to the invention, each resilient ring may alternatively consist of a three-dimensionally coiled torsion spring, which with at least one end convolution bear on a sliding surface of a rigid ring. This three-dimensionally coiled torsion spring may consist of a conical spiral spring made of stock which is approximately rectangular in cross-section and only one of the two end convolutions of said spring may bear on a sliding surface of a rigid ring whereas the other end convolution bears axially on a supporting surface of a rigid ring. In another alternative, three-dimensionally coiled torsion springs may consist of helical springs which at both end convolutions bear on the sliding surfaces of the rigid rings. In both cases the normal axial resilience of a conical spiral spring or a helical spring is superimposed on the resilience which is due to the cooperation of the spring with the sliding surfaces of the rigid rings. For this reason the excursion of the spring assembly is increased in both cases beyond the extent which is due to the cooperation of the spring with the sliding surfaces of the rigid rings although the spring assemblies embodying these features will have different spring characteristics.

It is apparent that the use of the resilient rings according to the invention enables the provision of spring assemblies having different characteristics, which may be further varied if the sliding surfaces have curved or angled characteristics, as is known per se.

BRIEF DESCRIPTION OF THE DRAWINGS

Embodiments of the invention are shown by way of example on the drawing, in which FIGS. 1 and 2 are axial sectional views showing a spring assembly having resilient rings consisting of plane spiral springs in FIG. 1 in an unloaded state and in FIG. 2 in a fully loaded state.

FIGS. 3 and 4 are axial sectional views showing another embodiment which comprises resilient rings consisting of plane spiral springs in FIG. 3 in an unloaded state and in FIG. 4 in a fully loaded state.

FIGS. 5 and 6 to 10 show various forms of resilient rings which may be used in the embodiments shown in FIGS. 1 to 4. Specifically FIG. 7 shows a ring which is particularly intended for the embodiment shown in FIGS. 3 and 4 and FIG. 8 shows a ring which is particularly intended for the embodiment shown in FIGS. 1 and 2.

FIGS. 11 and 12 are axial sectional views showing another embodiment of a spring assembly in FIG. 11 in an unloaded state and in FIG. 12 in a fully loaded state.

FIGS. 13 and 14 are axial sectional views showing a further embodiment of a spring assembly in FIG. 13 in an unloaded state and in FIG. 14 in a fully loaded state.

FIGS. 15 and 16 are axial sectional views showing a still further embodiment of a spring assembly in FIG. 15 in an unloaded state and in FIG. 16 in a fully loaded state.

DESCRIPTION OF THE PREFERRED EMBODIMENTS

Figure 10:
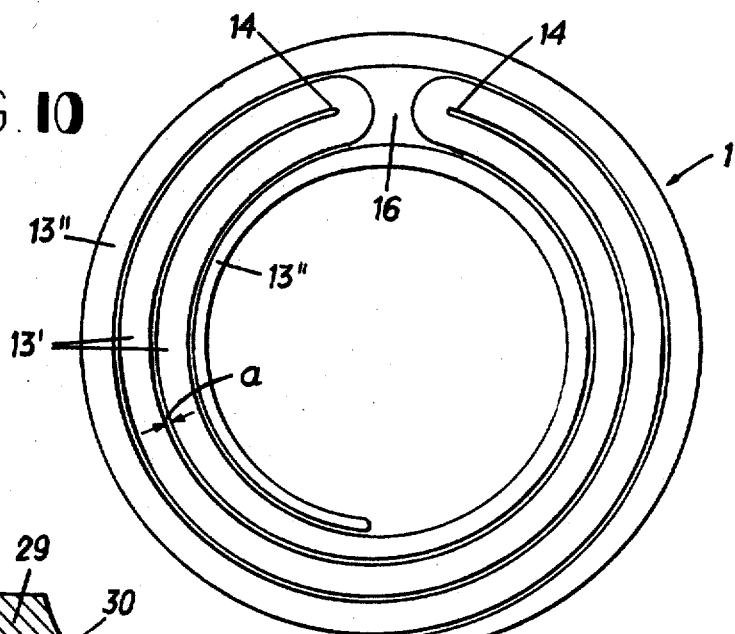

In the embodiment shown in FIGS. 1 and 2 the rings 1 consist of plane spiral springs and are surrounded by and cooperate with sliding surfaces 2 of the rigid rings 3. The rigid rings 3 are guided on a rod 4 and comprise an end ring 3'. Under load, the resilient rings slide on the sliding surfaces 2 so that the diameter of the resilient rings is decreased. FIG. 2 shows the position which is assumed under full load.

In the embodiment shown in FIGS. 3 and 4, the resilient rings 1 consist again of flat spiral springs and cooperate with sliding surfaces 5 of the rigid rings 6. The rigid rings comprise an end ring 6' and are guided on a rod 7. In this embodiment the resileint rings 1 surround the sliding surfaces 5 of the rigid rings, which in this case are similar to solid frustoconical members. FIG. 3 shows the spring assembly in an unloaded state. Under load, the resilient rings 1 are expanded as they slide on the sliding surfaces 5 to the position which is assumed under full load and shown in FIG. 4.

In these two embodiments, the resilient rings may consist of various kinds of plane spiral springs made of stock which is approximately rectangular in crosssection.

FIG. 5 shows a plane spiral spring which may be used as a resilient ring 1 in the embodiments shown in FIGS. 1 to 4. The convolutions contact each other even when the spring is relaxed. Each of the end portions 8 and 9 of the coiled rod or strip stock is tapered like a wedge approximately to the extent of an entire convolution. As a result, such resilient ring is damped from the beginning and has a high energy storage capacity.

The embodiment shown in FIG. 6 differs from that of FIG. 5 in that the spiral spring forming the resilient ring 1 has convolutions which are spaced apart by the distance $a$. As this spiral spring is compressed or expanded, adjacent convolutions will not contact each other until a certain load is applied, whereafter the friction will result in a damping.

FIGS. 7 and 8 show resilient rings 1 which consist of plane spiral springs having convolutions which have the same cross-section to their very ends. To maintain a circular shape, the convolutions are offset at 11 and 12 to the extent of the thickness of one convolution 10. The resilient ring shown in FIG. 7 is intended for an arrangement as shown in FIGS. 3 and 4, in which the resilient ring is expanded under load. The resilient ring shown in FIG. 8 is intended for an arrangement as shown in FIGS. 1 and 2, where the resilient ring 1 is reduced in diameter under load. For this reason, the offset portions 11 and 12 of the resilient ring of FIG. 8 are spaced apart to enable a compression of the resilient ring to a smaller diameter. In the embodiment shown in FIG. 9, the resilient ring 1 consists of a rod or strip 13, which has been reversely bent twice at 14 and 15 to change the hand of the convolutions so that the intermediate convolutions 13' are similar to a ring having a radial slit 16. The outer and inner convolutions 13" hold this radially slit ring together. A deformation of this ring will result in a friction only between the convolutions 13" and 13' whereas there will be no friction between the two convolutions 13'. The spring characteristic of such resilient ring will also differ from that of the ring shown, e.g., in FIG. 5.

The resilient ring 1 of FIG. 10 differs from the resilient ring of FIG. 9 only in that spaces $a$ are left between the convolutions 13', 13" and will be closed only under a certain load. FIGS. 11 and 12 show a spring assembly in which the resilient rings consist of conical spiral springs 17 made of stock which is approximately rectangular in cross-section. The outermost convolutions 17' of each conical spiral spring 17 cooperates with a sliding surface 18 of the rigid rings 19, which are guided on a rod 4. The innermost convolution 17" bears on a supporting surface 20 of the next upper rigid ring 19. As a result, these conical spiral springs 17 act partly as resilient rings sliding on the sliding surfaces 18 and partly as axially resilient conical spiral springs having axial resiliency. In the end position assumed under full load and shown in FIG. 12, each conical spiral spring 17 is compressed into a plane and has slidably moved downwardly along a sliding surface 18 so that its diameter has been reduced. It will depend on the dimensions whether the spring is axially or radilly compressed first or how the components of the excursion of the spring overlap. In any case it is apparent from the drawing that the excursion of the spring assembly along the rod 4 will be approximately doubled if the resilient rings consist of conical spiral springs compared to an assembly in which the resilient rings consist of plane spiral springs.

In the spring assembly shown in FIGS. 13 and 14 the resilient rings consist of helical springs 21, which can be axially compressed and slide on the two sliding surfaces 22 and 23 and are radially compressed until the compressed position shown in FIG. 14 has been reached. In the assembly shown in FIGS. 13 and 14 the helical springs 21 are cylindrical so that in the end position shown in FIG. 14 the end convolutions 21' have been deformed to be smaller in diameter than the intermediate convolutions 21". The embodiment shown in FIGS. 15 and 16 differs from the embodiment shown in FIGS. 13 and 14 only in that when the helical springs 24 are relaxed the end convolutions 24' are larger in diameter than the intermediate convolutions 24" so that all convolutions have approximately the same diameter in the loaded position shown in FIG. 16.

Figure 21:
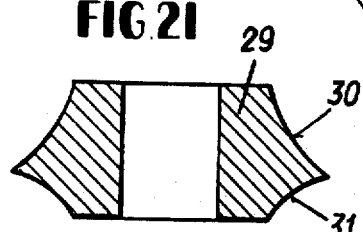
FIG. 21 shows modified sliding surfaces for the embodiment shown in FIGS. 3 and 4.
Figures 17, 18:
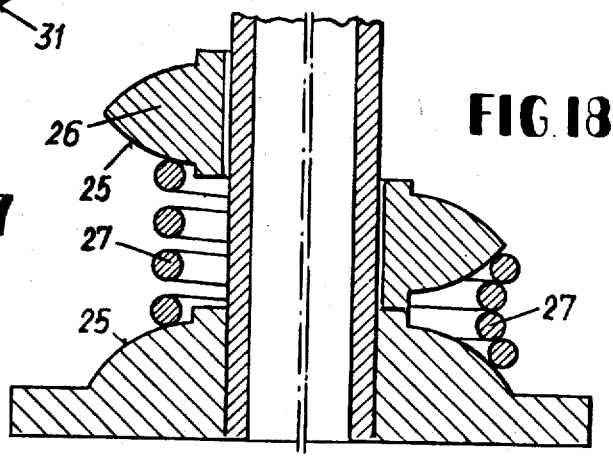
FIGS. 17 and 18 are axial sectional views showing another embodiment of a spring assembly in FIG. 17 in an unloaded state and in FIG. 18 in a fully loaded state.
Figures 19, 20:
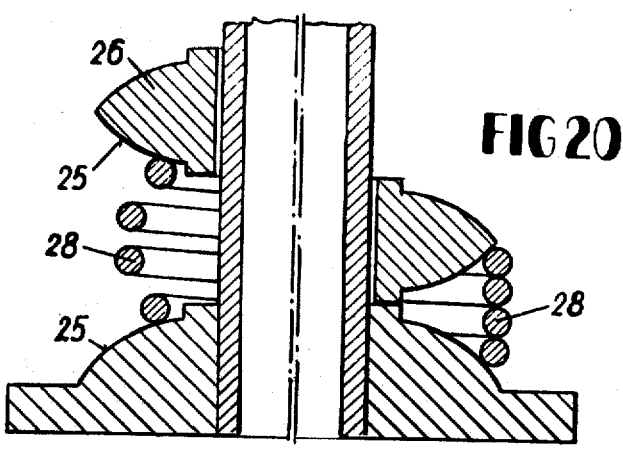
FIGS. 19 and 20 are axial sectional views showin a still further embodiment of a spring assembly in FIG. 19 in an unloaded state and in FIG. 20 in a fully loaded state.

FIGS. 17 to 20 show embodiments in which the resilient rings consist of helical springs 27 and 28 but these resilient rings are in sliding contact with internal sliding surfaces 25 of the rigid springs 26 in an arrangement which is similar to that of FIGS. 3 and 4. The only difference between FIGS. 17, 18 and FIGS. 19, 20 resides in that the helical springs 27 are initially cylindrical whereas in the other case the end convolutions of the helical springs 28 are initially smaller in diameter. In all cases, the sliding surfaces may have any configuration depending on the spring characteristic which is desired. FIG. 21 shows by way of example a rigid ring 29, which could be used instead of the rings 6 in FIGS. 3, 4 or of the rings 26 in FIGS. 17 to 20. That ring has different sliding surfaces 30, 31. The sliding surfaces 2, 18, and 22 may also have any desired configuration.

What is claimed is:

1. A spring assembly which has an axis and is adapted to take up and exert a force in the direction of said axis comprising a plurality of resilient rings which are axially stacked in alternation with rigid rings, each of the said resilient rings being arranged between two of said rigid rings, said rigid rings being formed with peripheral sliding surfaces which have generatrices that are inclined to said axis, said resilient rings bearing on said sliding surfaces and being in line contact with said sliding surfaces, each of said resilient rings being a coiled spring which has at least two convolutions, the neighbouring convolutions being in contact with each other at least in the finally compressed state of the spring assembly.

2. A spring assembly which has an axis and is adapted to take up and exert a force in the direction of said axis comprising a plurality of radially resilient rings which are axially stacked in alternation with rigid rings, each of the said resilient rings being arranged between two of said rigid rings, said rigid rings being formed with peripheral sliding surfaces which have generatrices that are inclined to said axis, said resilient rings bearing on said sliding surfaces and being in line contact with said sliding surfaces, each of said resilient rings being a coiled spring which has at least two convolutions, the neighbouring convolutions being in contact with each other at least in the finally compressed state of the spring assembly, said coiled springs being a spirally wound spring strip having an approximately rectangular cross section, the height of this rectangular cross section measured in axial direction of the spring assembly being constant over the whole length of said strip, and each of the said coiled springs forming a plane spiral at least in the finally compressed state of the spring assembly.

3. A spring assembly as set forth in claim 2, in which said sliding surfaces have generatrices which have portions having different inclinations to said axis.

4. A spring assembly as set forth in claim 3, in which said sliding surfaces have angled generatrices.

5. A spring assembly as set forth in claim 3, in which said sliding surfaces have curved generatrices.

6. A spring assembly as set forth in claim 2, in which said coiled spring has at least three convolutions.

7. A spring assembly as set forth in claim 2, in which said spring is designed so that its convolutions are spaced apart when said spring is relaxed and said convolutions contact each other after a predetermined path of axial compression of said spring assembly.

8. A spring assembly as set forth in claim 2, in which said spring has at each end an end portion which consists of at least one convolution and is tapered like a wedge whereby the radial thickness of the stip is diminished.

9. A spring assembly as set forth in claim 2, in which said spring consists of a strip which is uniform in cross-section throughout its length and is formed at the end of each winding with an offset portion which corresponds to the radial thickness of said stock.

10. A spring assembly as set forth in claim 2, in which said spring consists of a plane spiral spring and has two reverse bends, each of which is disposed between convolute portions of different hand.

11. A spring assembly as set forth in claim 10, in which said spring comprises approximately one convolution and a half between each reverse bend and the adjacent end of the spring and approximately one convolution between said reverse bends.

12. A spring assembly as set forth in claim 2, in which said spring consists of a three-dimensionally coiled torsion spring having two end convolutions and at least one of said end convolutions bears on one of said sliding surfaces.

13. A spring assembly as set forth in claim 2, in which said spring has inner and outer end convolutions, only one of said convolutions bearing on said sliding surface, said rigid rings have supporting surfaces approximately rectangular to the axis of the spring, and the other end convolution bearing on one of said supporting surfaces.

14. A spring assembly as set forth in claim 13, in which
said outer end convolution bears on said sliding surfaces and
said inner end convolution bears on said supporting surface.

15. A spring assembly which has an axis and is adapted to take up and exert a force in the direction of said axis comprising radially resilient rings which are axially stacked in alternation with rigid rings, each of the said resilient rings being arranged between two of said rigid rings, said rigid rings being formed with peripheral sliding surfaces which have generatrices that are inclined to said axis, said resilient rings bearing on said sliding surfaces and being in line contact with said sliding surfaces, each of said resilient rings being a coiled spring which has at least three convolutions, the neighbouring convolutions being in contact with each other at least in the finally compressed state of the spring assembly, each said coiled spring being a spirally wound spring rod, the cross section of which having approximately equal dimensions measured in axial and radial direction of the spring assembly, each of said coiled springs forming a helical spring and being designed so that it's convolutions are spaced apart in the axial direction of the spring assembly when said spring is relaxed and said convolutions contact each other after a predetermined path of axial compression of said spring assembly, each of said coiled springs having an end convolution at each end of the spring said end convolutions bearing on said sealing surfaces.

16. A spring assembly as set forth in claim 15 in which said sliding surfaces have generatrices which have portions having different inclinations to said axis.

17. A spring assembly as set foth in claim 16, in which said sliding surfaces have angled generatrices.

18. A spring assembly as set forth in claim 16, in which said sliding surfaces have curved generatrices.

\* \* \* \* \*